(12) United States Patent
Randt

(10) Patent No.: US 7,884,959 B2
(45) Date of Patent: Feb. 8, 2011

(54) PRINTING SYSTEM AND METHOD OF OPERATING SAME

(75) Inventor: Alan J. Randt, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1113 days.

(21) Appl. No.: 11/585,617

(22) Filed: Oct. 24, 2006

(65) Prior Publication Data

US 2008/0144080 A1   Jun. 19, 2008

(51) Int. Cl.
*G06F 15/00* (2006.01)
*G06F 15/173* (2006.01)

(52) U.S. Cl. .................................... 358/1.15; 709/239

(58) Field of Classification Search ............... 358/1.15, 358/1.13, 1.14, 1.12, 1.1, 296; 709/239, 709/227, 240, 224, 223; 714/25, 46, 33, 714/44, 37; 379/100.01, 209.01; 715/716, 715/751; 400/621, 708
See application file for complete search history.

(56) References Cited

U.S. PATENT DOCUMENTS

| | | | |
|---|---|---|---|
| 5,343,409 A | 8/1994 | Satterfield et al. ........... 364/514 |
| 5,542,069 A | 7/1996 | Meppelink et al. .......... 395/500 |
| 5,717,879 A | 2/1998 | Moran et al. ................ 395/339 |
| 6,310,692 B1 * | 10/2001 | Fan et al. .................... 358/1.14 |
| 6,496,837 B1 | 12/2002 | Howard et al. ............... 707/200 |
| 6,963,637 B2 | 11/2005 | Broussard et al. ....... 379/209.01 |
| 2002/0057772 A1 | 5/2002 | Miller .................... 379/100.01 |
| 2002/0071134 A1 | 6/2002 | Jackson et al. ............. 358/1.13 |
| 2003/0112452 A1 * | 6/2003 | McIntyre .................... 358/1.1 |
| 2004/0141201 A1 * | 7/2004 | Shima ........................ 358/1.15 |
| 2004/0196498 A1 | 10/2004 | Klassen ..................... 358/1.15 |
| 2005/0030574 A1 | 2/2005 | McVey et al. ............... 358/1.14 |
| 2005/0052660 A1 | 3/2005 | Sabbagh et al. .............. 358/1.1 |
| 2005/0160321 A1 | 7/2005 | Cleaveland et al. ........... 714/38 |
| 2005/0256665 A1 | 11/2005 | Hartmann et al. ........... 702/121 |
| 2005/0286071 A1 | 12/2005 | Faynor ....................... 358/1.15 |
| 2006/0010426 A1 * | 1/2006 | Lewis et al. ................. 717/124 |
| 2006/0050304 A1 * | 3/2006 | Abe et al. ................... 358/1.15 |
| 2007/0121151 A1 * | 5/2007 | Uchida ...................... 358/1.15 |

* cited by examiner

*Primary Examiner*—Saeid Ebrahimi Dehkordy
(74) *Attorney, Agent, or Firm*—Alix, Yale & Ristas, LLP

(57) ABSTRACT

Disclosed herein is a method of operating a printing system including determining a time of a print problem, accessing a database containing a timeline of print-related attribute changes, modifying one or more print-related attributes, and resubmitting print jobs. In another embodiment, a method of operating a printing system involves storing sets of print-related attributes in a settings repository, the stored sets being available for use in processing future print jobs. Corresponding printing systems also are disclosed. The methods and systems can be used to improve the efficiency and/or quality of high volume printing operations.

17 Claims, 7 Drawing Sheets

FIG. 4
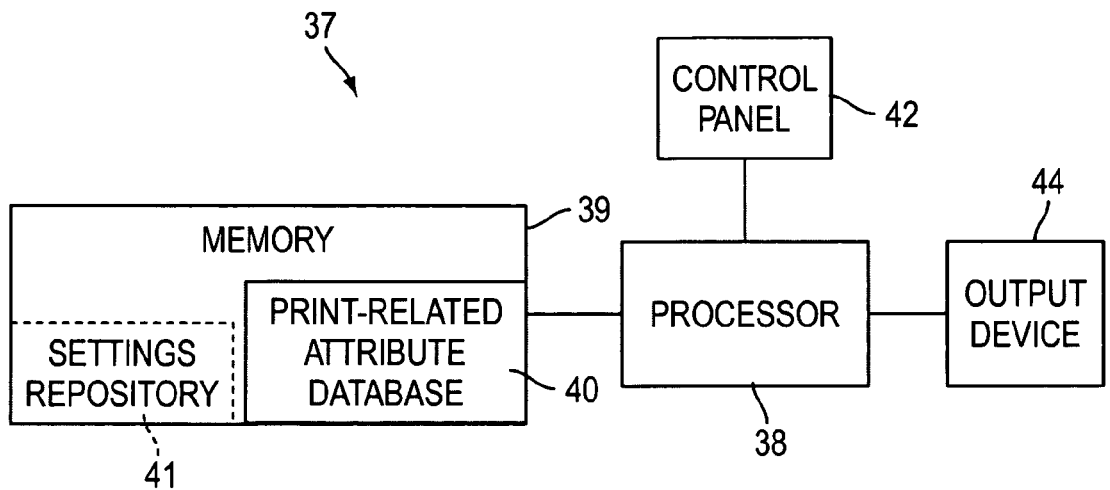
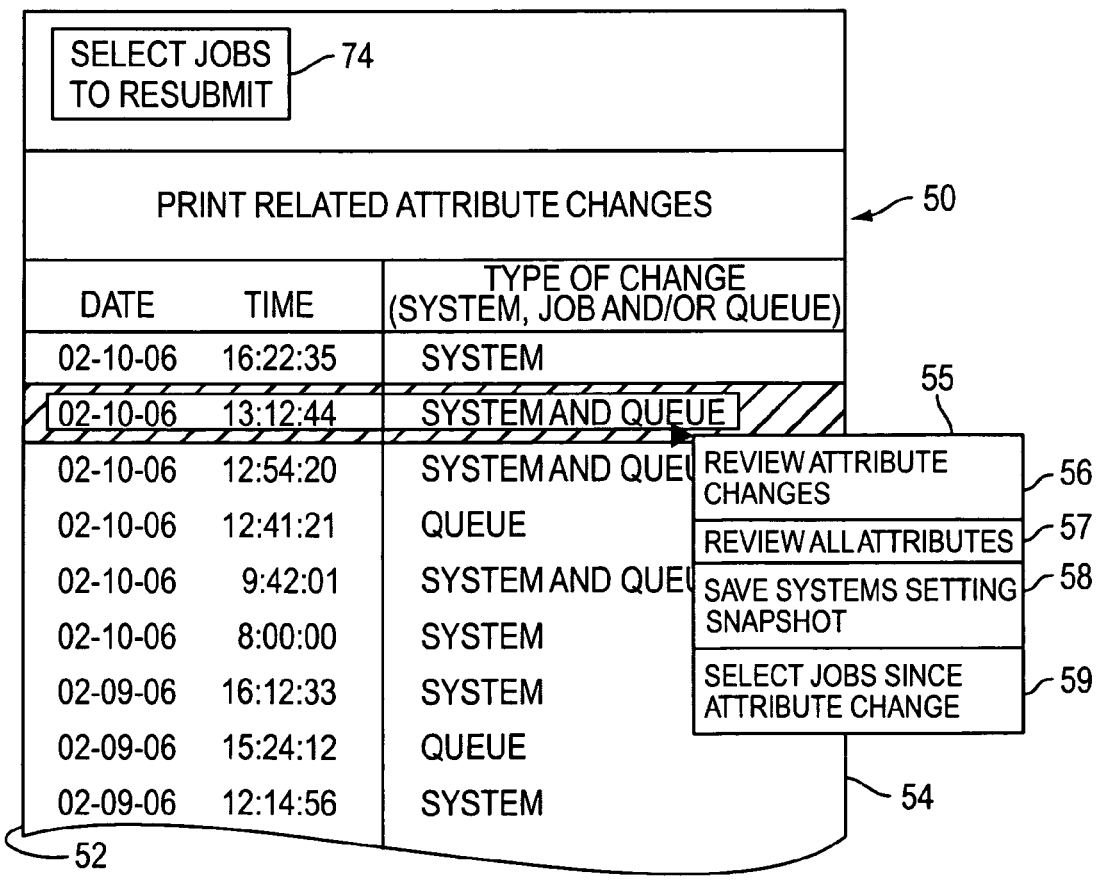
FIG. 5

| DATE | TIME | HISTORY | PRECEDANCE | QUEUE NAME | PREV. VAL | NEW VAL | DATA |
|---|---|---|---|---|---|---|---|
| 02-10-06 | 16:22:35 | DEFAULT FONT | SYSTEM | | COURIER | XYZ | |
| 02-10-06 | 13:12:44 | COLOR SOURCE PROFILE | QUEUE | FORNEWCLIENT | DEFAULT | NEW1 | |
| 02-10-06 | 13:12:44 | SECURITY | SYSTEM | | MEDIUM | HIGH | |
| 02-10-06 | 12:54:30 | PDF CACHING | SYSTEM | | NORMAL | OPTIMIZED | |
| 02-10-06 | 12:54:20 | PDF CACHING | QUEUE | | | | |
| 02-10-06 | 12:54:20 | TONE REPRODUCT CURVE | SYSTEM | | NORMAL | NORMAL | 44.TRC |

UNDO "<ROW ENTRY>"
REVERT TO STATE
CAPTURE STATE

FIG. 6

| RESUBMIT | DATE | START TIME | JOB ID | JOB NAME | SUBMITTER NAME |
|---|---|---|---|---|---|
| | \multicolumn{5}{c}{SELECT JOBS WITHIN LAST HOUR TO RESUBMIT} |
| X | 02-10-06 | 16:30:44 | 101 | abc | bob |
| X | 02-10-06 | 16:25:12 | 102 | def | bob |
| X | 02-10-06 | 16:23:14 | 103 | ghi | bob |
| X | 02-10-06 | 16:22:35 | 104 | jkl | bob |
| X | 02-10-06 | 16:07:14 | 105 | mno | bob |

SELECT ALL    DESELECT ALL    RESUBMIT SELECTED JOBS

PRINTING SYSTEM AND METHOD OF OPERATING SAME

BACKGROUND

The embodiments disclosed herein relate generally to print production, and more particularly to high volume print production management.

In digital publishing it is important for printers to generate documents at high throughput rates. When problems occur, such as paper jams or toner variability, it is necessary to re-run certain print jobs. Furthermore, when a computer that operates printer hardware is reconfigured, output may not meet the necessary qualifications and certain print jobs may need to be re-run.

Current digital printers are configured to hold and/or resubmit print jobs. A user usually is able to eventually determine what queue or system settings were used prior to a printing error or instance of poor image quality, and to change the print parameters to correct the problem. However, known systems do not enable print re-runs and corrections to be made quickly and easily when print-related attribute changes have been made at the system or queue level. It would be useful to develop a system for quickly re-executing faulty print jobs or returning to a state of preferred image quality, thereby minimizing losses in overall throughput rates of a printer due to printing problems.

SUMMARY

One embodiment described herein is a method of operating a printing system, comprising determining a time of a print problem, accessing a database containing a timeline of print-related attribute changes, modifying at least one print-related attribute in effect proximate the time of the print problem, and after modifying, resubmitting print jobs.

In some cases, the timeline includes changes in at least one of print output attributes, pre-press attributes, and printer set-up attributes. The print related attributes often include one or both of system level attributes and queue level attributes. In some cases, print-related attributes are saved as part of a set of print-related attributes in a settings repository for future use.

In some cases, the timeline is stored in a memory contained in a computer at least indirectly operative of printer hardware. In certain cases, the timeline of print-related attribute changes is continuously revised during printer operation and changes are stored in a memory. Sometimes, modifying at least one print-related attribute comprises reinstating a print-related attribute affecting image quality.

Another embodiment is a method comprising forming a database containing a timeline of print-related attribute changes, determining a time of a print problem, correcting the print problem after reviewing a portion of the timeline proximate the determined time, and resubmitting at least one print job submitted proximate the determined time.

In certain cases, correcting the print problem includes modifying at least one of the print-related attributes that was changed proximate the determined time. Sometimes, correcting the print problem includes changing printing conditions without revising print-related attributes. Often, the timeline includes changes in at least one of print output attributes, pre-press attributes, and printer set-up attributes. The timeline can be stored in a memory of a computer that is least indirectly operative of printing-hardware. In some cases, the method further comprises capturing sets of print-related attributes and storing the sets in a settings repository for future use.

Another embodiment is a method comprising forming a settings repository of print-related attribute sets, at least one set including system level attributes and queue level attributes. In some cases, the method further includes selecting a print-related attribute set from the settings repository and submitting at least one print job with the selected print-related attribute set.

Yet another embodiment is a printing system comprising a memory containing a timeline of print-related attribute changes, a control panel configured to display a selected portion of the timeline based upon a user request, and a processor configured to receive from the control panel and execute at least one of a modify command to modify a selected print-related attribute in the timeline and a resubmit command to resubmit jobs submitted after a particular time.

A further embodiment is a printing system comprising a memory containing sets of print-related attributes, at least one set including both system level attributes and queue level attributes, a control panel configured to display a set of print-related attributes based upon a user request, and a processor configured to use a selected set of attributes in processing a print job in response to a user command.

BRIEF DESCRIPTION OF THE DRAWINGS

FIG. 4 depicts an exemplary printing system that can be used for the methods described in FIGS. 1-3.

FIG. 5 shows an example of a screen display for an embodiment in which print-related attribute changes are captured in a timeline.

FIG. 6 provides an exemplary screen display showing a window with undo, revert to state and capture state commands.

FIG. 8 shows an exemplary screen display for selecting particular jobs for resubmission.

DETAILED DESCRIPTION OF THE INVENTION

Figure 1:
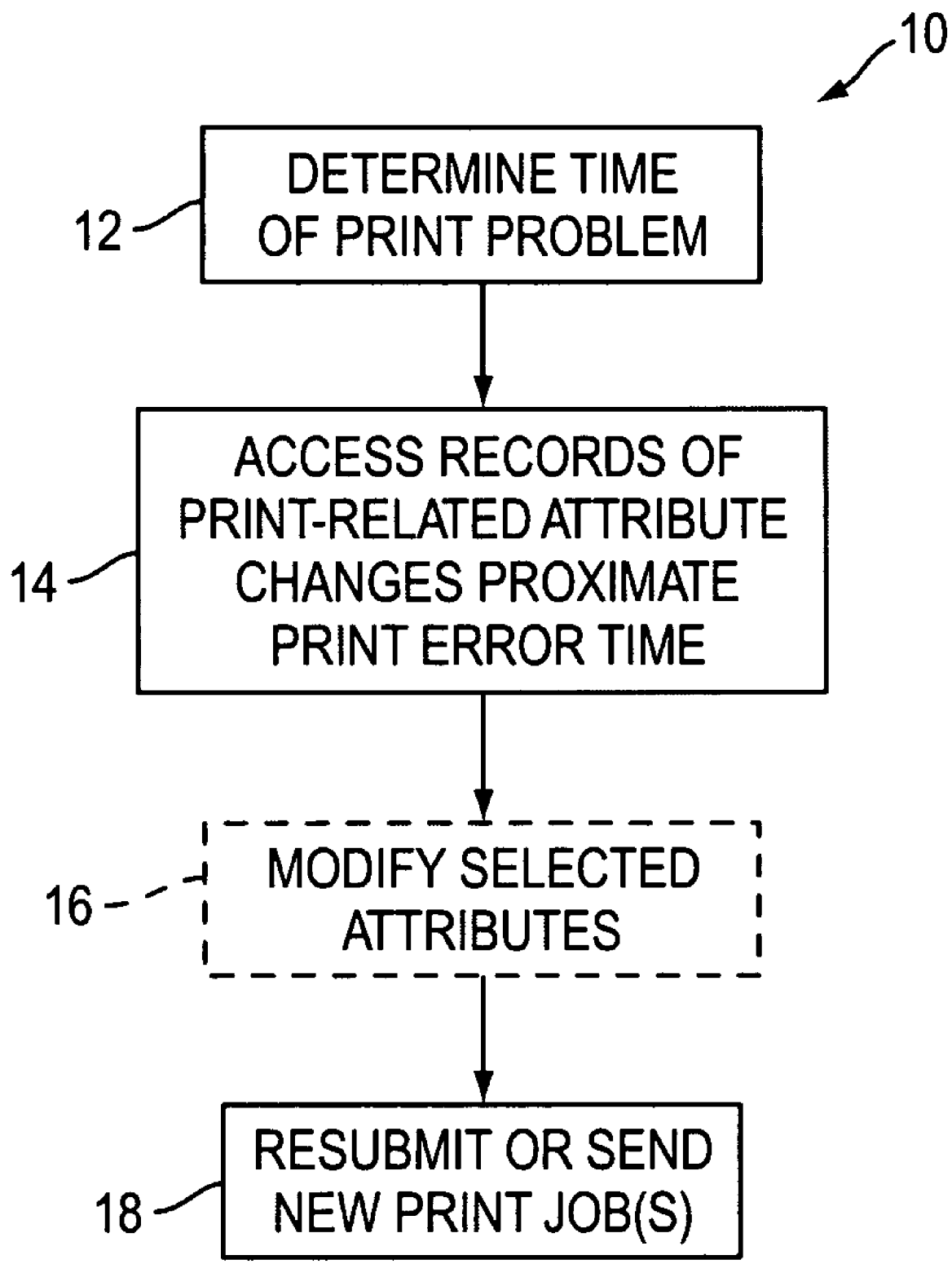
FIG. 1 is a process flow diagram showing a method of operating a printing system according to one embodiment.

Using the print configuration management system disclosed herein, changes that are made to a printing system that affect output, including system, queue and optionally also job level changes, are captured and stored in a timeline or other type of database in order that they can be quickly modified or recalled if desired at a later time. In one embodiment, the system improves print shop efficiency by allowing for the automatic correction of printing problems and the automatic re-run of faulty print jobs based upon minimal input from the operator. In another embodiment, the system keeps track of settings for multiple, related jobs that are printed. These may, for example, be multiple print jobs for a particular client, or multiple runs of one print job during exploratory use of a machine, such as a color image, using slightly different settings. For example, when multiple jobs are to be printed for a client, the preferred group of settings for the client can be captured and stored in a settings repository or another suitable location from which it can be conveniently recalled when the client requests a new print job at a later time. When multiple variations of a particular job are being run, the best group of settings can be determined, then captured, and optionally stored in a settings repository or another suitable location. This group of settings can then be conveniently selected for future print jobs. For example, with multiple variations of a print job in hand, a print shop may decide, for example, they prefer the output of the second job they printed. They can then look at a configuration management panel to determine what settings were used for the second job and return to those settings such as by undoing all subsequent changes or reverting to a particular set of attributes.

In one embodiment, print-related attribute changes, including those at the system and queue level, are captured with a time and date stamp, and the previous state of the changed settings is kept in memory to allow for reinstatement of earlier settings. This can be useful if printing problems occur in order to solve the problems by undoing particular setting changes. Reinstatement can take place, for example, as a result of execution of an undo command in connection with a particular print parameter or a set of print parameters. One disclosed embodiment provides for the automatic reprint of jobs printed during a period when the system was not printing as desired.

A "printing system" as used herein includes hardware and software aspects, such as a computer-based control system operative of printing hardware, such hardware possibly including xerographic, ink-jet, offset, or other marking technologies, or combination of technologies. A "time of a print problem" refers herein to an approximate time at which faulty printing commenced or an approximate timespan during which faulty printing took place. As used herein, a "timeline" refers to a database that can be arranged by date and time. A "print-related attribute" refers to a system level or queue level attribute in a system configuration that relates to printing, including but not limited to security level, color, font, caching, priority, etc. The print-related attributes also optionally include job level attributes. A "print-related attribute change" is a change from one print-related attribute to another, an addition of a new print-related attribute, or the removal of a print-related attribute. "Undo" refers to the act of or ability to modify any previously made command, attribute, or set of attributes.

The term "document" is used to denote a document in any state, including (but not limited to) when viewed on a computer display, when formatted as a print file ready for printing, and when in hardcopy form. The state the document is in at any point in the description depends on the context. Also, a "document" may include text, graphics or mixed representations. "Files" are documents or other stored sets of data. For the purposes of discussion herein, the term "printer" as used herein shall include all different types of printer and output devices, both hard (physical printer) and soft (Web server), or other hardcopy or document rendering apparatus and devices.

Referring to the figures and first to FIG. 1, a process flow diagram is shown for one embodiment and is designated as 10. In this embodiment, when a print problem such as a printing error or unsatisfactory image quality is detected, the approximate time that the print problem commenced is determined at 12. Examples of printing errors would be those resulting from the use of the wrong media, a paper jam, toner variability, etc. Examples of unsatisfactory image quality would be incorrect colors, insufficient resolution, undesired darkness or lightness, and any of a number of other visual defects. The print problem can be determined by examining output and/or by detecting a print error at a computer that is at least indirectly operative of printing hardware.

A database containing records of print-related attribute changes is then accessed at 14. Typically, this database is a stored timeline of print-related attribute changes that have been made. Each time entry in the database has a set of associated data including the identity of the attribute change that was made, and optionally also the identity of the previous corresponding attribute. The database usually includes system and queue level changes that affect print output, and often also includes print job level changes. By maintaining information about current and prior print-related settings in this way, after the operator has reviewed attribute changes they can, if necessary, modify selected attributes at 16 in order to correct print-related settings. In some cases, modifying involves undoing an individual attribute change or a set of attribute changes that were all made at approximately the same time or within a certain time period, such as all changes made after a certain time. A set of attribute changes can be undone as a group in a single step. In one embodiment, selections at the user interface correspond to specific groups of attributes and arguments that make up a system or queue level change. Each change queries the attribute change library or database to gather the data and invoke the changes throughout the software upon selection. In some cases, each system or queue element has an attribute dictionary or configuration file that can be updated upon such desired changes.

Once the desired print-related attributes have been determined and the data has been automatically transferred to the appropriate locations in the printing software system, the faulty print jobs are then resubmitted, or new print jobs are submitted, at 18. In some cases, after reviewing records of print-related attribute changes at 14, a determination will be made that no modification of attributes is required and the faulty print jobs are then resubmitted, or new print jobs are sent, at 18 after any other necessary corrections to the printing system are made. In some cases, the print jobs that need to be resubmitted can be selected from a listed display of print jobs. Alternatively, a specific time can be selected or entered, and all jobs executed after that time can be resubmitted.

Figure 2:
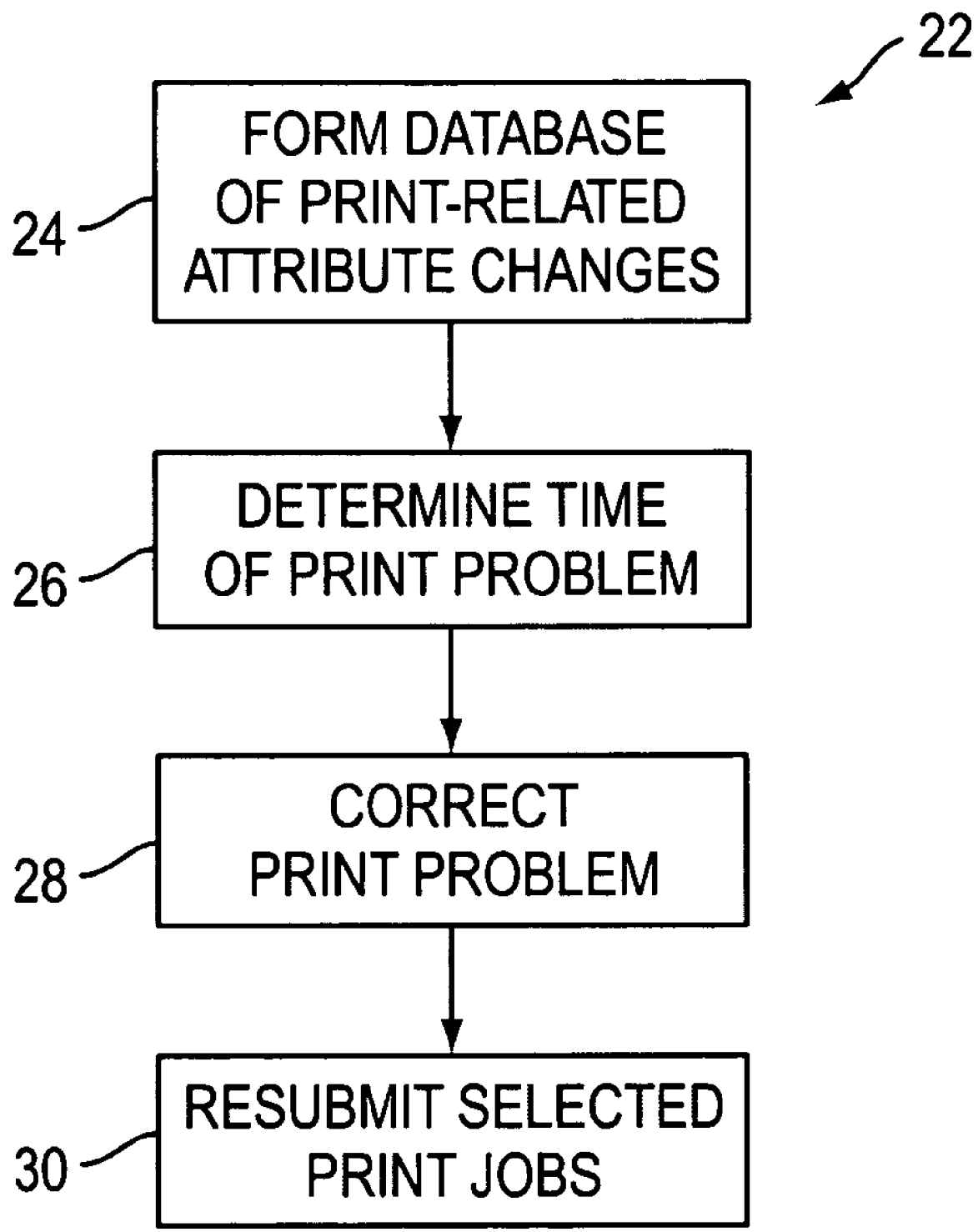
FIG. 2 is a process flow diagram showing a method of operating a printing system according to another embodiment.

In the embodiment shown in the process flow diagram of FIG. 2, generally designated as 22, print jobs are resubmitted without undoing particular attributes. A database containing a timeline of print-related attribute changes is formed at 24 and is stored in the system's memory. Typically, this database contains information about the set of print-related attributes currently in use during a particular time period on a particular printer, as well as the corresponding, previously used, print-related attributes. A single database can be used to track print parameter changes for an individual printer or a plurality of different printers. When a print problem is detected, the time of the problem is determined at 26. The print problem is corrected at 28, and the faulty print jobs are resubmitted at 30.

Figure 3:
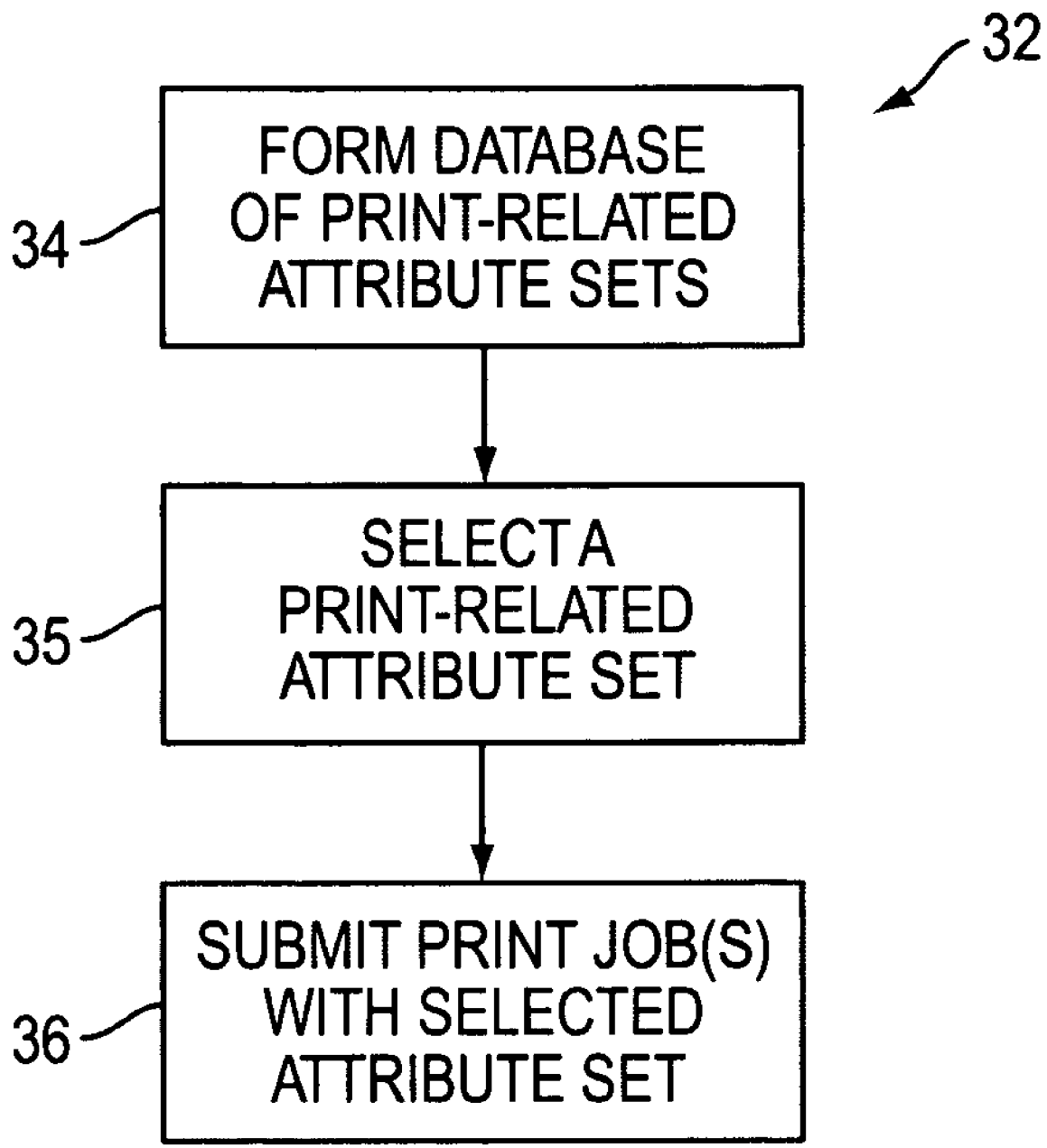
FIG. 3 is a process flow diagram showing an embodiment in which print-related attribute sets are stored for future use.

Referring to FIG. 3, a process flow diagram is shown for the reuse of a stored set of print-related attributes. The overall process is designated as 32. A database of print related attribute sets, one or more of which include both system level attributes and queue level attributes, is formed at 34. Later, a particular print-related attribute set is selected at 35 and is then utilized in conjunction with the submission of a particular print job at 36.

Referring to FIG. 4, a printing system in accordance with one embodiment is shown. The printing system 37 includes a processor 38 and a memory 39 containing a print-related attribute database 40. Usually, the database contains records of attribute changes. The print-related attribute changes are usually capable of being arranged in a timeline. In some cases, the memory 39 also includes a settings repository 41 containing sets of print-related attributes. The attributes in a particular set are intended to be used together. One or more of the sets in the settings repository 41 include both system level attributes and queue level attributes, and job level attributes optionally can be included. A control panel 42, which often includes a display panel, a keyboard and a mouse, enables an operator to review attribute changes, modify attribute changes, and resubmit faulty print jobs. Furthermore, the control panel often enables an operator to retrieve a particular set of attributes from the settings repository or the timeline for use. One or more output devices 44 are connected to the processor.

In some embodiments, a selected portion of the print-related attribute database 40 is shown on the display of the control panel 42 based upon a user request. The processor 38 receives commands from the control panel 42 to undo or otherwise modify certain print attributes and/or to resubmit certain print jobs to the output device 44. In certain embodiments, the processor 38 receives commands from the control panel 42 to retrieve a selected set of print-related attributes from the settings repository 41. The control panel 42, processor 38 and memory 39 may be part of a computer that is at least indirectly operative of printing hardware, such as a digital front end of a printer, or can be part of a workflow management system that is connected to multiple output devices.

FIG. 5 shows an exemplary screen shot 50 that appears on a display of a control panel. The screen shot 50 shows a list 52 of the dates and times within a specified period in which one or more print-related attribute changes were made. The level of the change or changes is displayed at 54. To view additional information, the operator selects a particular line entry. This opens a context menu 55 that gives the user the options of choosing to review the changed attributes associated with the time at 56, review all attributes in effect at the selected time at 57, or save the attributes in effect at the selected time in a settings repository by selecting "save systems setting snapshot" at 58. Another shortcut option or menu 55 is to resubmit all jobs submitted after the selected time. This shortcut is effected by selecting box 59, which states "Select Jobs Since Attribute Change." The context menu can be accessed, for example, by right-clicking on a particular line entry on screen display 50.

Another window that can be accessed from the display shown in FIG. 5 is shown in FIG. 6. This window can be accessed, for example, by left clicking on a line entry on the display of FIG. 5. The window shown in FIG. 6, designated as 60, displays certain print-related attributes that were in place at the selected time as well as the previous corresponding attributes. This window would be useful, for example, if a print shop wants to adjust settings and compare several different versions of a client's job. With multiple jobs in hand, the print shop may decide, for example, they prefer the output of the second job they printed. They can then look at a configuration management panel to determine what settings they had for the second job and return to those settings such as by undoing all subsequent changes or reverting to a particular set of attributes. Furthermore, they can save the selected set of attributes in the settings repository.

On the display shown in FIG. 6, an operator can highlight a particular line entry to access a context menu 62 (such as by using a right-click) that includes the commands "undo" at 64, "revert to state" at 68 and "capture state" at 69. By selecting undo, the operator modifies a current attribute such as by reinstating a previous value of a particular print-related attribute, such as default font, color source profile, security level, PDF caching, or tone reproduction curve. Optionally, each menu or screen can indicate job IDs printed at a particular instance of system configuration and a selection in this column or top level menu will bring up a similar listing of jobs to reprint. The user can then either select particular jobs (per row) or a particular job plus all subsequent jobs. By selecting revert to state at 68, the operator automatically undoes all print-related attributes that were made from a designated time forward. In certain cases, some of these attributes, such as PDF caching, can be accessed at either more than one level, such as either the queue level or the system level, while other attributes only can be accessed at a single level. By selecting "capture state", the operator captures a set of all settings in effect at the highlighted time for storage in the settings repository.

Figure 7:
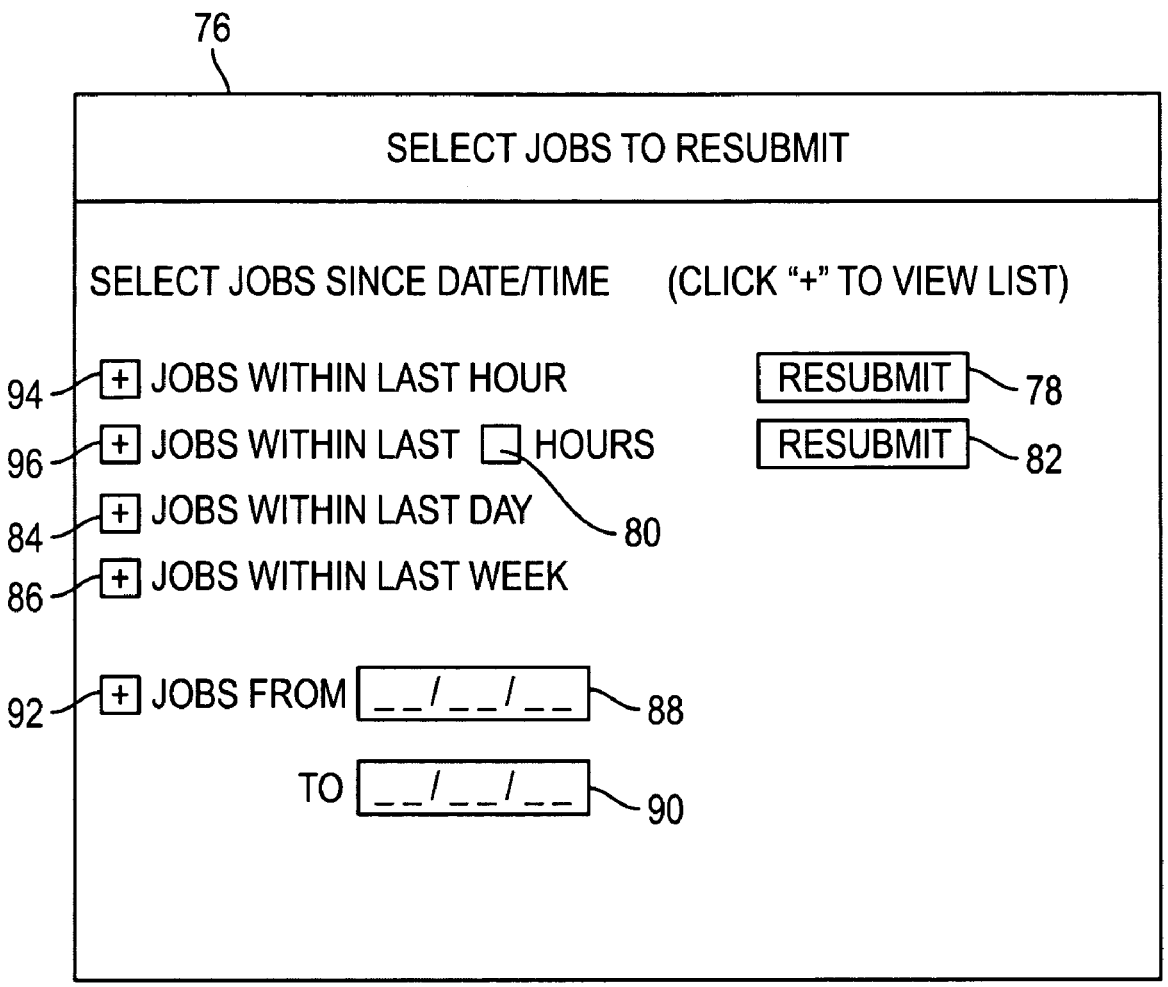
FIG. 7 shows an exemplary screen display for selecting jobs for resubmission.

FIG. 7 shows a screen display, designated as 76, that can be accessed by selecting button 74, "Select Jobs to Resubmit," on the display shown in FIG. 5. The screen display at 76 provides the user with an option to resubmit all jobs submitted within the last hour by selecting resubmit button 78. Jobs submitted within the last several hours can be selected by entering a number of hours in box 80 and then subsequently selecting resubmit button 82. Jobs submitted within the last hour can be displayed by selecting "+" in box 94. Jobs submitted within a previous period of hours can be displayed by entering a number of hours in box 80 and selecting "+" in box 94. Jobs submitted within the last day can be displayed by selecting "+" in box 84. Jobs submitted within the last week can be displayed by selecting the "+" in box 86, and a selected range of jobs can be displayed by filling in the desired dates in boxes 88 and 90 and then selecting the "+" in box 92. Based on the resulting display, the user can select which jobs are to be resubmitted.

If the user does not want to resubmit all jobs within the last one or more hours the "+" in box 94 or 96 can be selected to bring up a list of all jobs within a designated period. A non-limiting example of a display that can be obtained by selecting "+" at 94 is shown in FIG. 8, and is designated as 100. In the embodiment that is shown, a set of "X" marks appear in the left column at 102. The operator can individually deselect or select entries for resubmission. In some cases, for convenience, a "Select All" option is included at 104 and a "Deselect All" option is included at 106. After the appropriate jobs have been selected for resubmission, the operator selects button 108 in order to resubmit the selected jobs.

It will be appreciated that various of the above-disclosed and other features and functions, or alternative thereof, may be desirably combined into many other different systems or application. Various presently unforeseen or unanticipated alternatives, modifications, variation, or improvements therein may be subsequently made by those skilled in the art which are also intended to be encompassed by the following claims.

What is claimed is:

1. A method of operating a printing system, comprising:
   forming a database containing a timeline of print-related attribute changes,
   determining a time of a print problem,
   accessing a database containing a timeline of print-related attribute changes,
   reviewing a portion of the timeline of print related attribute changes proximate the determined time of the print problem,
   modifying at least one print-related attribute in effect proximate the time of the print problem, and
   after modifying, resubmitting print jobs.

2. The method of claim 1, wherein the timeline includes changes in at least one of print output attributes, pre-press attributes, and printer set-up attributes.

3. The method of claim 1, wherein the at least one print-related attribute includes a system level attribute.

4. The method of claim 1, wherein the at least one print-related attribute includes a queue level attribute.

5. The method of claim 1, wherein the at least one print-related attribute includes at least one system level attribute and at least one queue level attribute.

6. The method of claim 5, wherein the modified print-related attributes are saved as part of a set of print-related attributes in a settings repository for future use.

7. The method of claim 5, wherein the timeline is stored in a memory of a computer at least indirectly operative of printing hardware.

8. The method of claim 5, further comprising capturing sets of print-related attributes and storing the sets in a settings repository for future use.

9. The method of claim 1, wherein the timeline is stored in a memory contained in a computer at least indirectly operative of printer hardware.

10. The method of claim 1, further comprising continuously revising the timeline of print-related attribute changes during printer operation and storing changes in a memory.

11. The method of claim 10, wherein the timeline includes changes in at least one of print output attributes, pre-press attributes, and printer set-up attributes.

12. The method of claim 1, wherein modifying comprises reinstating a prior print-related attribute affecting image quality.

13. The method of claim 1, wherein modifying at least one print-related attribute comprises modifying a print-related attribute that was changed proximate the determined time of the print problem.

14. The method of claim 13, further comprising capturing sets of print-related attributes and storing the sets in a settings repository.

15. The method of claim 14, wherein the sets of print-related attributes include both system level attributes and queue level attributes.

16. The method of claim 1, wherein modifying at least one print-related attribute comprises changing printing conditions without revising print-related attributes.

17. A method comprising forming a settings repository of print-related attribute sets, at least one set including job level attributes, at least one system level attribute selected from the group consisting of font, security level, caching and tone reproduction curve, and at least one queue level attribute selected from the group consisting of color, caching and priority, selecting a print-related attribute set from the settings repository, and submitting at least one print job with the selected print-related attribute set.

\* \* \* \* \*